United States Patent
Stotski

(10) Patent No.: US 10,797,813 B2
(45) Date of Patent: Oct. 6, 2020

(54) TRANSMITTER DETECTION AS VEHICLES DRIVE THROUGH TUNNEL

(71) Applicant: Hirschmann Car Communication GmbH, Neckartenzlingen (DE)

(72) Inventor: Dimitri Stotski, Nuremberg (DE)

(73) Assignee: Hirshmann Car Communication GmbH, Neckartenzlingen (DE)

( * ) Notice: Subject to any disclaimer, the term of this patent is extended or adjusted under 35 U.S.C. 154(b) by 0 days.

(21) Appl. No.: 16/536,890

(22) Filed: Aug. 9, 2019

(65) Prior Publication Data

US 2019/0363811 A1 Nov. 28, 2019

Related U.S. Application Data

(63) Continuation of application No. PCT/EP2018/053351, filed on Feb. 9, 2018.

(30) Foreign Application Priority Data

Feb. 10, 2017 (DE) .................. 10 2017 102 680

(51) Int. Cl.
*H04H 20/62* (2008.01)
*H04H 60/11* (2008.01)
*H04H 60/54* (2008.01)

(52) U.S. Cl.
CPC ............ *H04H 20/62* (2013.01); *H04H 60/11* (2013.01); *H04H 60/54* (2013.01)

(58) Field of Classification Search
CPC ........ H04H 20/62; H04H 60/11; H04H 60/54; H04N 21/41422
USPC ................. 455/405; 348/726, 731; 370/329; 375/354; 725/5, 132
See application file for complete search history.

(56) References Cited

U.S. PATENT DOCUMENTS

| | | | | |
|---|---|---|---|---|
| 5,339,353 A * | 8/1994 | Asahara | ............... | H04W 24/00 455/405 |
| 6,748,040 B1 * | 6/2004 | Johnson | .................. | H04B 1/69 375/354 |
| 2008/0016542 A1 * | 1/2008 | Chozui | ................ | H04H 20/26 725/132 |
| 2011/0249193 A1 * | 10/2011 | Inoo | ....................... | H04H 40/27 348/726 |
| 2013/0135534 A1 * | 5/2013 | Murakami | ............. | H04H 20/26 348/726 |
| 2014/0173679 A1 * | 6/2014 | Kimura | ............ | H04N 21/41422 725/132 |
| 2014/0237494 A1 * | 8/2014 | Han | ....................... | H04H 60/23 725/5 |
| 2014/0307173 A1 * | 10/2014 | Aguilar Fargas | ...... | H04H 20/33 348/731 |
| 2015/0131548 A1 * | 5/2015 | Kitazato | ................ | H04H 40/18 370/329 |
| 2016/0007076 A1 * | 1/2016 | Takaki | ............ | H04N 21/41422 725/134 |
| 2019/0190646 A1 * | 6/2019 | Zoellner | ................ | H04H 60/11 |

FOREIGN PATENT DOCUMENTS

| | | |
|---|---|---|
| DE | 10 2012 204 090 A1 | 9/2013 |
| DE | 10 2018 001 047 A1 | 8/2018 |
| EP | 0973285 A2 | 1/2000 |
| WO | 2015162294 A1 | 10/2015 |

OTHER PUBLICATIONS

PCT International Search Report and The Written Opinion, dated Apr. 18, 2018, 10 pages.
Abstract of WO 2018146278, related to DE 102018001047, dated Aug. 16, 2018, 1 page.
Abstract of DE 1020122204090, dated Sep. 19, 2013, 1 page.
Abstract of EP 0973285, dated Jan. 19, 2000, 1 page.

* cited by examiner

*Primary Examiner* — Tan H Trinh
(74) *Attorney, Agent, or Firm* — Barley Snyder

(57) ABSTRACT

A method of operating a mobile receiving system includes the steps of registering and storing, in a first cycle, a plurality of receivable transmitters in a first specifiable frequency range with a first receiving method, and establishing a number of the receivable transmitters from the first cycle. The method further includes the steps of registering and storing, in a second cycle, a plurality of receivable transmitters in the first specifiable frequency range with the first receiving method, and establishing a number of the receivable transmitters from the second cycle. The number of receivable transmitters from the first cycle are compared with the number of receivable transmitters from the second cycle and, when the numbers of receivable transmitters in the first cycle and the second cycle deviate from one another by a first specifiable value, the first receiving method is switched to a second receiving method.

12 Claims, No Drawings

TRANSMITTER DETECTION AS VEHICLES DRIVE THROUGH TUNNEL

CROSS-REFERENCE TO RELATED APPLICATIONS

This application is a continuation of PCT International Application No. PCT/EP2018/053351, filed on Feb. 9, 2018, which claims priority under 35 U.S.C. § 119 to German Patent Application No. 102017102680.0, filed on Feb. 10, 2017.

FIELD OF THE INVENTION

The present invention relates to a method of operating a mobile receiving device and, more particularly, to a method of identifying receivable transmitters in multiple different cycles of the mobile receiving device.

BACKGROUND

A receiving device installed in a vehicle has antennas, a receiver, and a device for converting received high-frequency signals into reproducible signals. Audio signals are received from radio transmitters, which are registered with the vehicle during the journey as receivable transmitters. The radio transmitters are emitted by radio communication masts along the route of the vehicle.

Methods are known with which switching is performed from a receivable transmitter emitted from one radio communication mast to the same receivable transmitter emitted by another radio communication mast as the vehicle moves. Difficulties exist with the reception and the reproduction of receivable transmitters when these have, in one cycle, been received, stored, and entered in a list in order to reproduce them, and in a further cycle or further cycles in which at least a portion of these transmitters are no longer receivable. This can occur, for example, when the vehicle is driven into a tunnel, a multi-story car park, or an underground car park, such that the emitted transmitters are shielded by the external conditions and no longer reach the receiver at all or no longer reach it in a satisfactorily reproduced manner. This has the consequence that, in the next cycle, it is no longer possible to store all the transmitters or even any transmitter that was still able to be registered, stored, and entered into the list in the preceding cycle and accordingly reproduced. Using the receiving method which has been employed in the case of the first cycle, the reception criteria have been selected such that they do not make it possible to continue to receive transmitters, for example in the tunnel, the multi-story car park, the underground car park, or the like.

In the case of receiving methods such as frequency modulated radio data system (FM+RDS), digital audio broadcasting (DAB), digital video broadcasting (DVB) and the like, data are transmitted from which a service can be recognized individually, such as with the aid of an ID and/or a service name. In an automobile radio/tuner (receiver) the purpose is to display these data in a list, so that a user can make a selection from the transmitters displayed. However, care must always be taken that these services are kept as up-to-date as possible and are also actually available as soon as the user selects them. Because a transmitter landscape (the emitted transmitters and the transmitters receivable by the receiver) can change quickly in a moving vehicle, an approach or a scanning method must handle this situation in the most efficient manner. External conditions around a vehicle which significantly impair the reception of transmitters are currently not taken into account when operating mobile receiving devices.

SUMMARY

A method of operating a mobile receiving system includes the steps of registering and storing, in a first cycle, a plurality of receivable transmitters in a first specifiable frequency range with a first receiving method, and establishing a number of the receivable transmitters from the first cycle. The method further includes the steps of registering and storing, in a second cycle, a plurality of receivable transmitters in the first specifiable frequency range with the first receiving method, and establishing a number of the receivable transmitters from the second cycle. The number of receivable transmitters from the first cycle are compared with the number of receivable transmitters from the second cycle and, when the numbers of receivable transmitters in the first cycle and the second cycle deviate from one another by a first specifiable value, the first receiving method is switched to a second receiving method.

DETAILED DESCRIPTION OF THE EMBODIMENT(S)

Exemplary embodiments of the present invention will be described hereinafter in detail. The present invention may, however, be embodied in many different forms and should not be construed as being limited to the embodiments set forth herein. Rather, these embodiments are provided so that the present disclosure will convey the concept of the disclosure to those skilled in the art.

A receiving device installed in a vehicle has antennas, a receiver, and a device for converting received high-frequency signals into reproducible signals. Audio signals are received from radio transmitters, which are registered with the vehicle during the journey as receivable transmitters. The radio transmitters are emitted by radio communication masts along the route of the vehicle. In each cycle of a plurality of cycles, the receivable transmitters are received, stored, and entered in a list in order to reproduce them.

According to an embodiment, a number of saved transmitters from a first cycle is compared with a number of saved transmitters from a second cycle. When the numbers of saved transmitters deviate from one another by a specifiable value, a switch is made from a first receiving method to a second receiving method; this means that the number of saved transmitters is registered from the first cycle. After the second cycle has taken place, a number of saved transmitters is registered once again. These two ascertained numbers are compared to one another; if they agree or do not significantly deviate from one another, then the first receiving method is employed further in the following cycle or cycles. This is an indication that the external conditions around the vehicle do not, or do not significantly, impair the reception of transmitters. Only if a significant deviation by a specifiable value is established when comparing the two ascertained numbers is this an indication that the external conditions around the vehicle significantly impair the reception of transmitters, such that a relatively large number of transmitters therefore can no longer be received, stored and reproduced. This is the case, for example, if the vehicle is driven into a tunnel, a multistory car park, an underground car park, or the like.

However, it is desirable that transmitters, which are in principle still receivable in these areas (tunnels, multistory car parks, underground car parks or the like), but which, due to the reception criteria upon which the first receiving method is based, are no longer receivable or are possibly no longer satisfactorily reproducible, nevertheless continue to be received. For this reason, according to the invention, the established numbers of transmitters which deviate from one another is a measure of switching from the first receiving method to the second receiving method, which is based on different reception criteria from the first receiving method. As an example of the reception criterion, the reception level must be larger in the case of the first receiving method in order to receive and reproduce transmitters than in the second receiving method, in the case of which a lower reception level is taken as the basis for the assessment of whether a transmitter is stored, entered into the list and reproduced.

After a switch has been made to the second receiving method with second reception criteria, it is possible to carry out further cycles for the reception of transmitters, wherein, on the basis of the second reception criteria of the second receiving method, either in part or in full, the transmitters which were still able to be received with the first receiving method can likewise be received, or other transmitters which hitherto were actually able to be received with the first receiving method but which, as a result of the underlying reception criteria have not been stored and entered into the list, are now taken into account for storing and for entry into the list. As a result, it is possible to continue to take into account those transmitters which, for example, could be received and reproduced before driving into a tunnel for as long as the reception criteria of the first receiving method allow. If one of the transmitters deviates from the reception criterion such that it can no longer be reproduced satisfactorily, it is no longer stored and also no longer entered in the list. However, the other stored transmitters in the list are further taken into account after driving into the tunnel as long as they no longer fulfil the reception criteria of the first receiving method, but rather fulfil those of the second receiving method. This has the advantage that a plurality of transmitters which were able to be received and reproduced prior to driving into the tunnel, for example, can also be received and reproduced while driving through the tunnel. This would not be the case if the reception criteria of the first receiving method only were taken as a basis while driving through the tunnel. Furthermore, it is advantageous that, while driving through the tunnel, other transmitters which were able to be received on the basis of the reception criteria of the first receiving method, prior to driving into the tunnel, but which have not been stored and entered into the list, can now, after driving into the tunnel, be received, stored and entered into the list, and reproduced.

The method according to the invention is continuously repeated while driving through the tunnel; it results that the numbers in the list do not change significantly while driving through the tunnel or do not change at all, indicating that the vehicle is still being driven through the tunnel. Only when the vehicle has finished driving through the tunnel and leaves the tunnel must it be assumed that the number of transmitters in the list in one cycle significantly changes again shortly before, during, or shortly after the end of the tunnel, because the shielding, by the tunnel, of the transmitters emitted from the radio communication mast ceases. While the number of transmitters in the list generally significantly decreases (halves, for example) after two or more cycles upon driving into the tunnel, and this is an indication of driving into a tunnel, the increase in transmitters in the list after two or more cycles after driving out of the tunnel is conversely an indication of driving out of the tunnel. This consequently means that, when the number of saved transmitters in the list after two or more cycles significantly deviates from one another by the specifiable value (increases, in this case), a switch is made from the second receiving method, which has been employed while driving through the tunnel, either to the first receiving method, which has been employed prior to driving into the tunnel, or possibly also to a third receiving method.

The description above was carried out on the basis of the external conditions around the vehicle when it drives from a main route into a tunnel, drives through said tunnel and then drives out of the tunnel again onto a main route. This description, however, is only given by way of example and is not limited to the tunnel situation, such that the method according to the invention can also be applied to comparable situations in which, due to the external conditions around the vehicle, the signal reception is restricted. Comparable situations prevail, for example, when the vehicle drives into a multistory car park or an underground car park. Other instances of poor reception are also possible.

In various embodiments, prior to the switching and after the switching, the specifiable value may be identical to or different from one another. There are thus different criteria available which are used to decide when switching is carried out from the first receiving method to the second receiving method or from the second receiving method to the first or third receiving method.

The method according to the invention is explained in greater detail below using an exemplary embodiment.

The vehicle is moving in an urban environment, for example, and the plurality of transmitters A, B, C and D are received, stored and entered into the list by the first receiving method EV1, which is based on reception criteria which ensure a specifiable reception quality, in order to thus store the receivable transmitters and enter them into the list. The number of stored transmitters is thus 4 transmitters. This has been established by the vehicle multiple times, i.e. continuously, in at least one cycle, generally during the movement of the vehicle in the urban environment. In an embodiment, the specifiable reception quality is a field strength of the receivable transmitter.

If the vehicle is moved into an underground car park, it must be assumed that, after driving into the underground car park, either no transmitter at all can be reproduced any more, because the reception criteria of the first receiving method EV1 no longer allow a transmitter which is possibly still weakly receivable to be stored and entered into the list, or that absolutely no transmitters at all can be received due to the shielding effect by the underground car park. However, should transmitters still be able to be received, albeit weakly, the invention exploits this by switching from the first receiving method EV1 with its "high" reception criteria to another receiving method EV2 with "lower" reception criteria. As a switching criterion, according to the invention, the changed number of saved transmitters in the list after one or more cycles is evaluated and consulted for the actual switching. This means that the actual receiving situation is advantageously taken into account and no other criteria, such as the determination of the position of the vehicle with a navigation system, have to be consulted, because these other criteria are imprecise.

In the example embodiment, it is thus established after several cycles during or after driving into the underground car park that it is no longer possible to receive all four transmitters, but rather that only one single transmitter (D, for example) has been received, stored and entered into the list. There is thus only one single transmitter still in the list.

The decrease in transmitters in the list during at least two cycles (from 4 to 1) is thus a criterion indicating that the receiver has to switch from the first receiving method EV1 to the second receiving method EV2. Due to the different reception criteria of these two receiving methods EV1, EV2, it is at least possible to store the individual transmitter D, which can still be received in the underground car park with the second receiving method EV2, and furthermore enter it into the list. Moreover, it is still conceivable that at least one further transmitter E can also still be received with the receiving method EV2 in the underground car park. As a result, the number of transmitters in the list would rise from 1 to 2, but with this rise not yet exceeding a specifiable value which would allow a switch to be made from the second receiving method EV2 to the first receiving method EV1 or possibly a third receiving method EV3. Only if the receiving situation in the underground car park, for example, presents itself such that further new transmitters, for example new transmitters E, F or more, which were not able to be received prior to driving into the underground car park, or further previous transmitters, for example A, B and/or C, which have been received prior to driving into the underground car park, then the number of transmitters in the list after at least two cycles deviates from one another again from the previous 1 or 2 by the specifiable value, so that the criterion for switching again is fulfilled and the switching takes place.

This describes the situation while the vehicle is situated in the underground car park, because, due to the external conditions around the vehicle, it is not ruled out that transmitters also receivable up to now prior to driving into the underground car park, or new transmitters, can be received in the underground car park. The aim is always to store, and enter into the list, as many transmitters as possible and to reproduce them to a satisfactory quality. However, the situation described above also relates to the situation when the vehicle drives out of the underground car park again. A typical practical case can be seen in that, as already described further above, due to the shielding in the underground car park either no transmitter at all can be received any more or only the one transmitter D can be received. If the vehicle now drives out of the underground car park, the receiving situation changes such that, for example, the transmitters A, B and C which were receivable before driving in can again be received along with the one transmitter D. Due to the significant rise in the number of transmitters in the list which has been established after at least one cycle, in this case too the criterion for the switching from the second receiving method EV2 to the first receiving method EV2 or a third receiving method EV3 is fulfilled so that the receiver will carry out this switching.

After this switching, further cycles can then take place so that furthermore, the transmitter landscape is scanned and, for example, after the driving out of the underground car park, not only the previous transmitters A, B, C and D are received, stored and entered into the list as well as reproduced, but rather new transmitters E, F and so on can also be added. Depending on the external conditions around the vehicle, it can also not be ruled out that an existing transmitter or several existing transmitters can no longer be received, which is often the case in the event of a longer drive through a tunnel. The method according to the invention thus also offers the possibility, by scanning the transmitter landscape, of storing further new receivable transmitters, entering them into the list of the number of transmitters and reproducing these transmitters.

In the exemplary embodiment of the tunnel, the method according to the invention is capable of identifying a tunnel entry, recording/saving previously known transmitters and the frequencies thereof and data of good quality, particular scanning behavior in the tunnel (optimal use of different scanning modes), identifying a tunnel exit, and the fastest possible depiction of all available transmitters (as far as possible with all data)

From an operational sequence of cycles (Background Scan), the number of available good transmitters is firstly saved prior to the start of a scan. After every scanned frequency, the current number of good transmitters still available is requested from the station list and compared with the number saved at the beginning. As soon as a critical number of transmitters is fallen short of, for example when 50% of the transmitters saved at the beginning become "invisible" due to poor quality, a tunnel entry is detected. Conversely, the same applies to the tunnel exit.

There are various scan modes (types of the cycles). The difference lies mainly in the scan duration. In a Spectrum Scan, which is relatively quick, only the quality parameters are requested. In a Full Information Scan, which is relatively slow, all additional data is awaited in the case of transmitters of good quality. In the tunnel, for example, only Spectrum Scans are performed in order to detect the tunnel exit as fast as possible. In this case, newly recognized, or previously unknown, good transmitters, without data, are entered into the list.

After the first tunnel cycle, the number of good transmitters available is saved and no longer updated. In addition, an erroneous detection, e.g. out of the Background Scan ("BGS"), can be corrected.

In principle, the same approach is carried out in the case of a tunnel exit as in the case of a tunnel entry (from BGS and AF-Following), except that the number of transmitters is no longer updated after a tunnel is detected. As soon as a specifiable number of transmitters has been exceeded, for example when 150% of the number of transmitters saved at the beginning of the tunnel detection is reached, a tunnel exit is detected.

Both for the tunnel entry and for the tunnel exit, there is a minimum number of transmitters starting from which the tunnel handling is intended to function. From the BGS, for example, at least 6 transmitters in order to detect the tunnel entry, and, for example, 4 transmitters in order to detect the tunnel exit. From the AF-Following, for example, at least 2 transmitters and at least 3 transmitters in the AF-list.

In principle, from the moment when the detection of the tunnel exit takes place, it is possible to "unveil" in the list all transmitters which were available prior to the tunnel. It can however be the case that some transmitters are no longer available. Starting from the tunnel exit, the Spectrum Scan is started once again from the beginning, because it can be the case that the scan had arrived, at the time of the exit, at the end of the frequency range. Stations (transmitters) which were already known prior to the tunnel are unveiled with all data, if they are of good quality. New stations are firstly unveiled without data (only frequency) in the list. As soon as the next Full Information Scan is triggered or the user tunes into the frequency, the data come into the list.

The list of the number of transmitters displayed to an operator contains only those transmitters which meet the reception criteria of the respective receiving method.

In an embodiment, the method is employed in the FM range. It may generally be employed for all transmission methods which transmit specific data (e.g. transmission names).

What is claimed is:

1. A method of operating a mobile receiving system, comprising:
registering and storing, in a first cycle, a plurality of receivable transmitters in a first specifiable frequency range with a first receiving method;
establishing a number of the receivable transmitters from the first cycle;
registering and storing, in a second cycle, a plurality of receivable transmitters in the first specifiable frequency range with the first receiving method;
establishing a number of the receivable transmitters from the second cycle;
comparing the number of receivable transmitters from the first cycle with the number of receivable transmitters from the second cycle; and
when the numbers of receivable transmitters in the first cycle and the second cycle deviate from one another by a first specifiable value, switching from the first receiving method to a second receiving method.

2. The method of claim 1, further comprising entering the plurality of receivable transmitters from the first cycle into a list.

3. The method of claim 2, wherein the second cycle occurs when the registering and storing, establishing, and entering steps are completed for the first cycle.

4. The method of claim 3, further comprising entering the plurality of receivable transmitters from the second cycle into the list.

5. The method of claim 2, wherein the receivable transmitters of the first receiving method are only registered, stored, and entered into the list when they have a specifiable reception quality.

6. The method of claim 5, wherein the reception quality is a field strength of the receivable transmitter.

7. The method of claim 1, wherein, when the first receiving method has been switched to the second receiving method, the steps for the first cycle and the second cycle are repeated with the second receiving method until the number of receivable transmitters from the first cycle deviates from the number of receivable transmitters from the second cycle by a second specifiable value.

8. The method of claim 7, wherein, when the number of receivable transmitters from the first cycle using the second receiving method differs from the number of receivable transmitters from the second cycle using the second receiving method by the second specifiable value, the second receiving method is switched to the first receiving method.

9. The method of claim 8, wherein the receivable transmitters that are receivable before the switching are stored up to the next switching.

10. The method of claim 7, wherein, when the number of receivable transmitters from the first cycle using the second receiving method differs from the number of receivable transmitters from the second cycle using the second receiving method by the second specifiable value, the second receiving method is switched to a third receiving method.

11. The method of claim 7, wherein the first specifiable value is the same as the second specifiable value.

12. The method of claim 7, wherein the first specifiable value is different from the second specifiable value.

* * * * *